United States Patent [19]
Takemura

[11] Patent Number: 5,575,736
[45] Date of Patent: Nov. 19, 1996

[54] TOROIDAL-TYPE CONTINUOUSLY VARIABLE TRANSMISSION

[75] Inventor: Hiromichi Takemura, Fujisawa, Japan

[73] Assignee: NSK, Ltd., Tokyo, Japan

[21] Appl. No.: 389,051

[22] Filed: Feb. 15, 1995

[30] Foreign Application Priority Data

Mar. 8, 1994 [JP] Japan .................................. 6-037014

[51] Int. Cl.⁶ .................................................. F16H 15/38
[52] U.S. Cl. .............................................. 476/46; 476/40
[58] Field of Search ................................ 476/39, 40, 46

[56] References Cited

U.S. PATENT DOCUMENTS

| 4,909,092 | 3/1990 | Machida et al. | 74/200 |
|---|---|---|---|
| 5,007,298 | 4/1991 | Machida | 476/46 |

FOREIGN PATENT DOCUMENTS

| 2521673 | 8/1983 | France . |
|---|---|---|
| 1203078 | 10/1965 | Germany . |
| 62-71465 | 5/1987 | Japan . |
| 62-158250 | 10/1987 | Japan . |
| 1-173552 | 12/1989 | Japan . |
| 5-71515 | 9/1993 | Japan . |

Primary Examiner—Charles A. Marmor
Assistant Examiner—David Fenstermacher
Attorney, Agent, or Firm—Shapiro and Shapiro

[57] ABSTRACT

A toroidal-type continuously variable transmission is obtainable having excellent durability without generating vibration. Given each inner diameter of the power rollers as $d_i$, the outer diameter thereof as $d_o$, and the diameter of each pitch circle of the plural balls which constitutes the thrust ball bearings as $d_p$, an expression of $3<d_o^2/(d_i \cdot d_p)<5$ is satisfied. As a result, the tensile stress can be suppressed to less than its fatigue limit. Thus any damage, such as cracks, due to repeated tensile stresses in the inner diametral portion of the power rollers are reduced. Also, the maximum contact pressure is suppressed to less than its critical contact pressure in order to prevent any indentations from being formed on the surface of the raceways arranged for the power rollers.

1 Claim, 7 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission. More particularly, the invention relates to a toroidal-type continuously variable transmission used for a speed change gear for an autovehicle or for various kinds of industrial machinery.

2. Related Background Art

The use of a toroidal-type continuously variable transmission which is schematically shown in FIG. 1 and FIG. 2 is under study as a speed change gear for an autovehicle. This toroidal-type continuously variable transmission is such that a disc 2 on the input side is supported coaxially with an input shaft 1, and a disc 4 on the output side is fixed to the end portion of an output shaft 3 coaxially arranged with the input shaft 1, as disclosed in the specification of Japanese Utility Model Laid-Open Application No. 62-71465, for example. In the inner side of the casing where the toroidal-type continuously variable transmission is housed, trunnions 6 and 6 are provided, centering on the pivots 5 and 5 arranged in the orthogonal positions with respect to the input shaft 1 and output shaft 3.

The trunnions 6 and 6 are provided with the pivots 5 and 5 on the outer faces of both ends, and also, in the central portions of the trunnions 6 and 6, the base ends of the displacement shafts 7 and 7 are supported, respectively. The trunnions 6 and 6 are allowed to swing centering on the pivots 5 and 5 to make it possible to freely adjust each inclined angle of the displacement shafts 7 and 7. Around the displacement shafts 7 and 7 supported by the trunnions 6 and 6, power rollers 8 and 8 are rotatively supported, respectively. Each of the power rollers 8 and 8 is pinched between the discs 2 and 4 on the input and output sides.

The inner faces 2a and 4a, where the discs 2 and 4 on the input and output sides face each other, have concave cross-sections, each of which is obtainable by following a respective circle centered on the aforesaid pivot 5. The spherically convex circumferential surfaces 8a and 8a of the power rollers 8 and 8 can abut the inner faces 2a and 4a, respectively.

Between the input shaft 1 and the disc 2 on the input side, a pressing device 9 of a loading cam type is arranged. By this pressing device 9, the disc 2 on the input side is pressed elastically toward the disc 4 on the output side. The pressing device 9 is structured by a cam board 10 which rotates together with the input shaft 1, and a plurality of rollers 12 and 12 (four rollers, for instance) supported by a cage 11. On one side face (on the left side face in FIG. 1 and FIG. 2) of the cam board 10, the cam surface 13 which is circumferentially concave and convex is formed. Likewise, on the outer surface (on the right side face in FIG. 1 and FIG. 2) of the disc 2 on the input side, a cam surface 14 is formed. Thus the plurality of rollers 12 and 12 are rotatively supported in the radial direction around the axis extending along the center of the input shaft 1.

When the toroidal-type continuously variable transmission structured as described above is used, the plurality of rollers 12 and 12 are pressed toward the cam surface 14 on the outer side face of the disc 2 on the input side by the function of the cam surface 13 along the rotation of the cam board 10 following the rotation of the input shaft 1. Therefore, at the same time that the disc 2 on the input side is pressed toward the plurality of power rollers 8 and 8, the disc 2 on the input side is allowed to rotate when the pair of cam surfaces 13 and 14 engage with the plurality of rollers 12 and 12. Then the rotation of the disc 2 on the input side is transmitted to the disc 4 on the output side through the plurality of power rollers 8 and 8. In this way, the output shaft 3 fixed to the disc 4 on the output side rotates.

Now, in a case where the rotational speed of the input shaft 1 and output shaft 3 should be changed, and in particular when a speed reduction should be performed between the input shaft 1 and output shaft 3, the trunnions 6 and 6 are caused to swing around the pivots 5 and 5 to incline the displacement shafts 7 and 7, respectively, so that, as shown in FIG. 1, the circumferential surfaces 8a and 8a of the power rollers 8 and 8 can abut the portion close to the center of the inner side face 2a of the disc 2 on the input side and the portion close to the outer circumference of the inner side face 4a of the disc 4 on the output side, respectively.

On the contrary, in order to accelerate, the trunnions 6 and 6 are caused to swing to incline the displacement shafts 7 and 7, respectively, so that, as shown in FIG. 2, the circumferential surfaces 8a and 8a of the power rollers 8 and 8 can abut the portion close to the outer circumference of the inner side face 2a of the disc 2 on the input side and the portion close to the center of the inner side face 4a of the disc 4 on the output side, respectively. If each of the displacement shafts 7 and 7 is set at an intermediately inclined angle between those shown in FIG. 1 and FIG. 2, an intermediate reduction ratio can be obtained between the input shaft 1 and output shaft 3.

Further, FIG. 3 to FIG. 4 are views which show a toroidal-type continuously variable transmission in a more specific form represented on a microfilm of Japanese Utility Model Application No. 63-69293 (Japanese Utility Model Laid-Open Application No. 1-173552). The disc 2 on the input side and disc 4 on the output side are rotatively supported on the circumference of an annular tube inner shaft 15 through needle bearings 16 and 16, respectively. Also, the cam board 10 engages with the outer circumference of the end (on the left end portion in FIG. 3) of the input shaft 15 by use of a spline, and its movement in the direction parting from the disc 2 on the input side is blocked by a rib 17. Then the pressing device 9 of a loading cam type is arranged in such a manner that the disc 2 on the input side is allowed to rotate by the rotation of the input shaft 15 while being pressed toward the disc 4 on the output side by means of the cam board 10 and rollers 12 and 12. To the disc 4 on the output side, an output gear 18 is coupled by use of keys 19 and 19 so that these discs 4 on the output side and the output gear 18 can rotate in synchronism.

Both ends of a pair of trunnions 6 and 6 are swingably supported by a pair of supporting boards (plates) 20 and 20 to make them freely displaceable in the axial direction (but in the direction toward its front and back in FIG. 3, that is, in the direction toward the left and right sides in FIG. 4). Then the displacement shafts 7 and 7 are supported in the portions, where circular holes 23 and 23 are formed respectively, in the intermediate sections of the trunnions 6 and 6. The displacement shafts 7 and 7 are provided with the supporting shafts 21, 21 and pivotally supporting shafts 22, 22 which are arranged eccentrically and in parallel to each other, respectively. Of these shafts, the supporting shafts 21 and 21 are rotatively supported inside each of the circular holes 23 and 23 through the needle bearings 24 and 24. Also, on the circumference of each of the pivotally supporting shafts 22 and 22, power rollers 8 and 8 are rotatively supported through other needle bearings 25 and 25.

In this respect, the pair of the displacement shafts 7 and 7 are arranged in a position 180 degrees opposite to the input shaft 15. Also, the direction in which each of the pivotally supporting shafts 22 and 22 of the displacement shafts 7 and 7 is eccentrically arranged with respect to the supporting shafts 21 and 21 is the same direction (reverse direction on the left and right sides in FIG. 4) with respect to the rotational direction of the discs 2 and 4 on the input and output sides. Also the eccentric direction is the direction substantially orthogonal to the direction in which the output shaft 15 is arranged. Therefore, each of the power rollers 8 and 8 is supported to be slightly displaceable in the arrangement direction of the input shaft 15. As a result, even when each of the power rollers 8 and 8 tends to be displaced in the axial direction of the input shaft 15 because of dimensional precision and the like of the constituent parts, such displacement can be absorbed without giving any excessive force to each of the constituent parts.

Also, between each outer surface of the power rollers 8 and 8 and each inner surface of the trunnions 6 and 6, the thrust ball bearings 26 and 26, which are antifriction bearings, and needle bearings 27 and 27 are arranged in that order from the outer surface side of each of the power rollers 8 and 8. Of these bearings, the thrust ball bearings 26 and 26 allow each of the power rollers 8 and 8 to rotate while supporting and receiving the load exerted on each of the power rollers 8 and 8 in its thrust direction. Each of these thrust ball bearings 26 and 26 comprises a plurality of balls 29, 29; annular cages 28, 28 which support each of the balls 29, 29 rotatively and movably; and annular outer rings 30, 30. Each raceway of the inner rings of thrust ball bearings 26 and 26 is formed on each outer surface of the power rollers 8 and 8, and each raceway of the outer rings is formed on each inner surface of the outer rings 30 and 30.

Also, each of the thrust needle bearings 27 and 27 comprises a race 31, a cage 32, and needles 33 and 33. Of these constituents, the race 31 and cage 32 can be slightly displaced in combination in the rotational direction. The thrust needle bearings 27 and 27 support the races 31 and 31 by pinching them between each of the inner surfaces of the trunnions 6 and 6, and the outer surface of the outer rings 30 and 30 in a state where the races abut the inner surfaces of the trunnions. The thrust needle bearings 27 and 27 allow the pivotally supporting shafts 22, 22 and the outer rings 30, 30 to swing around the supporting shafts 21, 21 while receiving and supporting the thrusting loads exerted on the outer rings 30, 30 by the power rollers 8, 8, respectively.

Further, to each end of the trunnions 6 and 6 (in the left side end in FIG. 4), each of the driving rods 36 and 36 is coupled. On the outer circumference of the intermediate section of the driving rods 36 and 36, driving pistons 37 and 37 are fixed, respectively. Then the driving pistons 37, 37 are fitted oil-tightly into driving cylinders 38, 38, respectively.

In a case of a toroidal-type continuously variable transmission structured as described above, the rotation of the input shaft 15 is transmitted to the disc 2 on the input side through the pressuring device 9. Then the rotation of the disc 2 on the input side is transmitted to the disc 4 on the output side through the pair of power rollers 8 and 8. Further, the rotation of the disc 4 on the output side is drawn from the output gear 18.

When the ratio of rotational speed should be changed between the input shaft 15 and the output gear 18, the pair of the driving pistons 37 and 37 are displaced in the directions opposite to each other. Along with the displacement of each of the driving pistons 37 and 37, the pair of trunnions 6 and 6 are displaced in the directions opposite to each other. For example, the power roller 8 on the lower side in FIG. 4 is displaced to the right side in FIG. 4, while the power roller 8 on the upper side in FIG. 4 is displaced to the left side in FIG. 4, respectively, hence changing the orientation of the force in the tangential direction, which is exerted on the portion where the circumferential surfaces 8a, 8a of these power rollers 8, 8 abut upon the inner surfaces 2a, 4a of the disc 2 on the input side and disc 4 on the output side. Then, along with this orientational change of force, the trunnions 6 and 6 are allowed to swing in the directions opposite to each other around the pivots 5 and 5 supported by the supporting boards 20 and 20. As a result, as shown in FIG. 1 and FIG. 2, the abutting positions of the circumferential surface 8a, 8a of the power rollers 8, 8 and the aforesaid inner surfaces 2a, 4a are changed to vary the ratio of the rotational speed between the input shaft 15 and the output gear 18.

In this respect, when the inclined angle of the displacement shafts 7 and 7 should be changed in order to vary the ratio of rotational speed between the input shaft 15 and the output gear 18 as described above, each of the displacement shafts 7 and 7 should rotate slightly centering on each of the supporting shafts 21 and 21, respectively. Therefore, because of this rotation, each outer surface of the outer rings 30 and 30 of the thrust ball bearings 26 and 26, and each inner surface of the trunnions 6 and 6 are relatively displaced. Between these outer surfaces and inner surfaces, each of the thrust needle bearings 27 and 27 is present. Consequently, the required force can be small for effectuating this relative displacement. Then it is possible to use only a small force for changing the inclined angle for each of the displacement shafts 7 and 7 as described above.

However, no particular consideration has been given to the configuration of the power rollers 8 and 8 of the toroidal-type continuously variable transmission structured to function as described above. As a result, there are encountered some cases where the durability and reliability obtainable therefor are not necessarily sufficient. In other words, when the toroidal-type continuously variable transmission is in operation, a load F such as shown in FIGS. 5A and 5B is exerted on the circumference 8a of power roller 8 from the inner side faces 2a and 4a of the disc 2 on the input side and the disc 4 on the output side at diametrically opposite positions on the power roller 8, in directions normal to the respective contact portions.

Then, the power roller 8 is elastically deformed due to the component force $F_r$ of the load F in the radial direction as exaggeratedly indicated by a broken line in FIG. 6A. As the result of this elastic deformation, a tensile stress is caused to act on the inner circumferential edge portion of the power roller 8 in the positions a and a corresponding to the acting point of the load F, and a compressive stress is caused to act on it in the positions β and β which are deviated 90 degrees from the acting point thereof. Therefore, while the toroidal-type continuously variable transmission is in operation, the tensile stress and compressive stress are caused to act repeatedly on the inner circumferential edge portion of the power roller 8. When each of the stresses of the kind becomes great, there tends to occur damage such as cracks on the inner circumferential edge portion of the power roller, thus marring the durability and reliability of the toroidal-type continuously variable transmission.

The tensile stress and compressive stress causing such a drawback as described above become greater when the thickness of $(d_o - d_i)/2$ of the power roller 8 in the radial direction is smaller. In other words, when the outer diameter do of the power roller 8 is the same, the thickness becomes smaller if the inner diameter $d_i$ of the power roller 8 is larger as shown in FIG. 5A, and then, it is easier for this power roller 8 to be elastically deformed by a load in the radial direction. Hence each of the stresses becomes greater. Therefore, in order to reduce each stress, it is obviously effective to make the inner diameter $d_i$ of the power roller 8 smaller. However, if only the inner diameter $d_i$ is just made smaller, the radial needle bearing 25, which is installed between the inner circumferential surface of the power roller 8 and the outer circumferential surface of the pivotal section 22 of the displacement shaft 7, should be made smaller (that is, its diameter is made smaller) accordingly. Thus a great facial pressure is caused to act upon the rolling surface of the needles constituting the radial needle bearing 25, the inner circumferential surface of the power roller 8, and the outer circumferential surface of the pivotal section 22 (see FIG. 4). As a result, the durability of each of these surfaces is adversely affected.

The tensile stress $\sigma_r$ generated in the inner diametral section of the power roller 8 by the elastic deformation resulting from the component force $F_r$ in the radial direction described above is expressed by the formula (1) given below.

$$\sigma_r \propto \{d_i^m/(d_o-d_i)^n\} \cdot F_r \tag{1}$$

In this respect, m and n in this formula (1) are constants of 1 or more, respectively. Also, $d_o-d_i$ is the value which represents the thickness of the power roller 8 in the radial direction (to be exact, it must be multiplied by ½). From this formula (1), it is understandable that the greater the inner diameter $d_i$ of the power roller 8, the greater becomes the value of numerator, and the smaller becomes the value of denominator at the same time, and that the tensile stress $\sigma_r$ resulting from the component force $F_r$ in the radial direction becomes greater.

On the other hand, the component force $F_a$ of the load F in the thrusting direction adds a thrusting load Q, as shown in FIGS. 7A and 7B, to the raceway of the inner ring formed on the outer surface of the power roller 8 at the contacting portions for the balls 29 and 29 (see FIG. 3 and FIG. 4) constituting the thrust ball bearing 26. Resulting from this thrusting load Q, a tensile stress $\sigma_a$ is generated on the inner diametral section of the power roller 8 as shown in FIG. 7B. This tensile stress $\sigma_a$ is expressed by the formula (2) given below.

$$\sigma_a \propto d_p^k \cdot Q \tag{2}$$

In this respect, k is a constant of 1 or more. The thrusting load Q is the value determined according to the formula $Q=F_a/Z$, that is, a value obtainable by dividing the component force $F_a$ by the number Z of the balls 29 and 29. Also, $d_p$ is the diameter of each pitch circle of plural balls 29 and 29 (see FIG. 3 and FIG. 4) constituting the thrust bearing 26. It is clear from the formula (2) that the greater the diameter $d_p$ of the pitch circle, the greater becomes the tensile stress $\sigma_a$ resulting from the thrusting load Q.

Eventually, to the inner diametral section of the power roller 8, a tensile stress $\sigma_T$, expressed by the formula (3) given below, is added while a toroidal-type continuously variable transmission is in operation.

$$\sigma_T=(\sigma_r+\sigma_a) \propto \{d_i^m/(d_o-d_i)^n\} \cdot F_r+d_p^k \cdot Q \tag{3}$$

As clear from the formula (3), in order to make the tensile stress $\sigma_T$ added to the inner diametral section of the power roller 8 small, an arrangement should only be made so that the outer diameter $d_o$ of the power roller 8 is made large while the inner diameter $d_i$ and the diameter $d_p$ of the pitch circle are made small. For example, the influence of a ratio, $d_o^2/(d_i \cdot d_p)$, between the square $d_o^2$ of the outer diameter $d_o$, and the product $d_i \cdot d_p$ of the inner diameter $d_i$ and the diameter $d_p$ exerted on the tensile stress $\sigma_T$, should be represented as indicated by solid line a in FIG. 8. From the representation by this solid line a, it is understandable, too, that in order to suppress the tensile stress $\sigma_T$, an arrangement should be made so that the outer diameter $d_o$ of the power roller 8 is made greater while the inner diameter $d_i$ and the diameter $d_p$ of the pitch circle are made smaller.

However, if the outer diameter $d_o$ of the power roller 8 is simply made greater while making the inner diameter $d_i$ and the diameter $d_p$ of each pitch circle smaller, the maximum contact pressure $P_{max}$ becomes inevitably high between the rolling surface of the balls 29 and 29 constituting the thrust ball bearing 26 (see FIG. 3 and FIG. 4) and the surface of the raceway of its counterpart. In other words, each rolling surface of the balls 29 and 29 is pressed to the raceway surface of its counterpart by the component force $F_a$ in the thrusting direction of the load F exerted on the power roller 8, and then, the maximum contact pressure $P_{max}$ is generated on such contact portion. If this maximum contact pressure $P_{max}$ becomes excessive, the raceway surface, where the balls 29 and 29 are pressed, is plastically deformed to have indentations. Therefore, the smaller the maximum contact pressure $P_{max}$, the better. A maximum contact pressure $P_{max}$ is expressed by the formula (4) given below in relation to the diameter $d_p$ of pitch circle of the power roller 8.

$$P_{max}=K \cdot (Q/Z)^{1/3}=K' \cdot (1/d_p)^{1/3} \tag{4}$$

In the formula (4), K and K' are a constants (>1). From the formula (4), it is clear that in order to make the maximum plane contact pressure $P_{max}$ smaller, the diameter $d_p$ of the pitch circle of the power roller 8 should be made greater, and also, the number Z of the balls should be arranged to be as many as $(\pi \cdot d_p = Z \times (\text{ball diameter}+\text{gap}), \therefore d_p \propto Z)$. In other words, the influence of a ratio, $d_o^2/(d_i \cdot d_p)$, between the square $d_o^2$ of the outer diameter $d_o$, and the product $d_i \cdot d_p$ of the inner diameter $d_i$ and the diameter $d_p$ exerted on the maximum contact pressure $P_{max}$, should be represented as indicated by broken line b in FIG. 8. From the representation by this broken line b, it is understandable, too, that in order to suppress the maximum contact pressure $P_{max}$, an arrangement should be made so that the outer diameter $d_o$ of the power roller 8 is made smaller while the inner diameter $d_i$ and the diameter $d_p$ of the pitch circle are made greater.

As described above, in order to reduce the tensile stress $\sigma_T$ which leads to damage such as cracks of the power roller 8, the diameter $d_o$ of the power roller 8 should be made greater while making the inner diameter $d_i$ and the diameter $d_p$ of the pitch circle smaller. Also, in order to suppress the maximum contact pressure $P_{max}$, which leads to the plastic deformation of the raceway surface, to a small level, the outer diameter $d_o$ of the power roller 8 should be made smaller while making the inner diameter $d_i$ and the diameter $d_p$ of the pitch circle greater. To satisfy these contradictory requirements, there is a need for the aforesaid ratio, $d_o^2/(d_i \cdot d_p)$, between the square $d_o^2$ of the outer diameter $d_o$ and the product $d_i \cdot d_p$ of the inner diameter $d_i$ multiplied by the diameter $d_p$ of the pitch circle to be regulated within an appropriate range. Therefore, in accordance with the present invention, a toroidal-type continuously variable transmission is designed in consideration of these circumstances as described above.

SUMMARY OF THE INVENTION

It is an object of the invention to provide a toroidal-type continuously variable transmission having an excellent durability, but not generating vibrations.

In the same manner as the conventional toroidal-type continuously variable transmission described earlier, a toroidal-type continuously variable transmission according to the present invention also comprises, for example, the first and second discs 2 and 4 arranged coaxially and rotatively supported in a state that the inner surfaces 2a and 4a of the discs face each other; trunnions 6 and 6 which can swing centering on the pivots 5 and 5 arranged in positions twisted with respect to the central axes of the first and second discs 2 and 4; displacement shafts 7 and 7 extending from the inner surfaces of the trunnions 6 and 6; and power rollers 8 and 8 held between the first and second discs 2 and 4 in a state of being rotatively supported on the circumference of the the displacement shafts 7 and 7 as shown in FIG. 1 and FIG. 2. Further, as shown in FIG. 3 and FIG. 4, thrust ball bearings 26 and 26 are provided between the outer side face of the power rollers 8 and 8, and the inner side face of the trunnions 6 and 6 in order to allow the power rollers 8 and 8 to rotate, while receiving and supporting loads exerted on the power rollers 8 and 8 in the thrusting direction, for example.

Particularly, for the toroidal-type continuously variable transmission according to the present invention, it is featured that given the inner diameter of the power rollers 8 and 8 as $d_i$, the outer diameter thereof as $d_o$, and the diameter of each pitch circle of the plural balls 29 and 29 constituting the thrust ball bearings 26 and 26 as $d_p$, the following expression is satisfied:

$$3 < d_o^2/(d_i \cdot d_p) < 5$$

To this end, a power roller 8 which constitutes a toroidal-type continuously variable transmission according to the present invention is arranged such that the outer diameter $d_o$, the inner diameter $d_i$ and the diameter $d_p$ of pitch circle have a relationship as shown in FIG. 5B, for example, while making the thickness greater in the radial direction as compared with the conventional structure.

The toroidal-type continuously variable transmission structured as described above can transmit the rotational power between the first disc 2 and the second disc 4 on the basis of the same functions as those of the conventional toroidal-type continuously variable transmission described earlier, and also, can change the ratio of rotational speed between these two discs 2 and 4 by changing the inclined angles of the trunnions 6 and 6.

Particularly, for a toroidal-type continuously variable transmission according to the present invention, it is possible to prevent both the tensile stress $\sigma_T$ and the maximum contact pressure $P_{max}$ from becoming greater than the allowable limits by regulating the relationship to be $3 < d_o^2/(d_i \cdot d_p) < 5$ between the inner diameter $d_i$ of the power rollers 8 and 8, the outer diameter $d_o$ thereof, and each diameter $d_p$ of the plural balls 29 and 29 constituting the thrust ball bearings 26 and 26.

BRIEF DESCRIPTION OF THE DRAWINGS

FIG. 5A represents the conventional structure thereof, and FIG. 5B represents that of the present invention.

FIG. 6A represents a state of the elastic deformation schematically, and FIG. 6B represents the distribution of the compressive stress and tensile stress schematically.

FIG. 7A represents the acting points of loads schematically, and FIG. 7B represents schematically the state of the tensile stress being exerted.

DETAILED DESCRIPTION OF THE PREFERRED EMBODIMENTS

Figure 1:
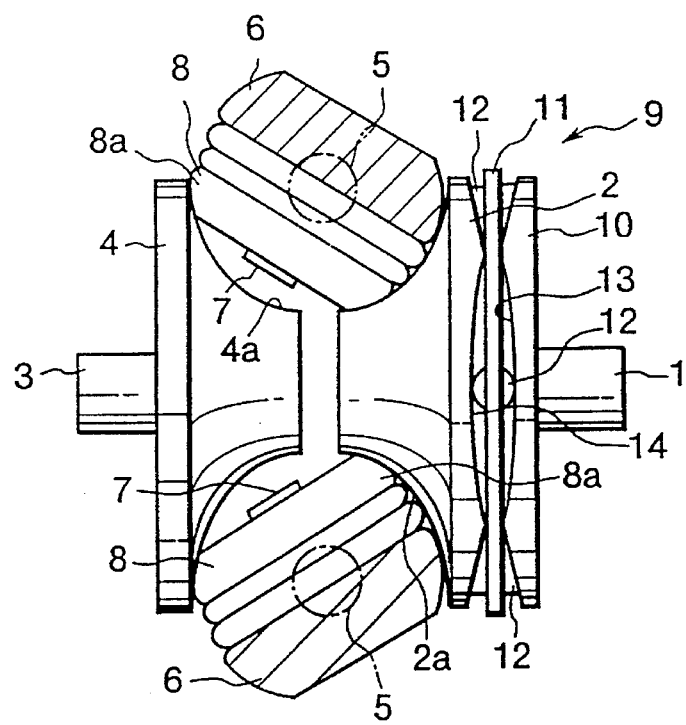
FIG. 1 is a side view which shows the fundamental structure of a conventionally known toroidal-type continuously variable transmission in a maximum state of speed reduction.
Figure 2:
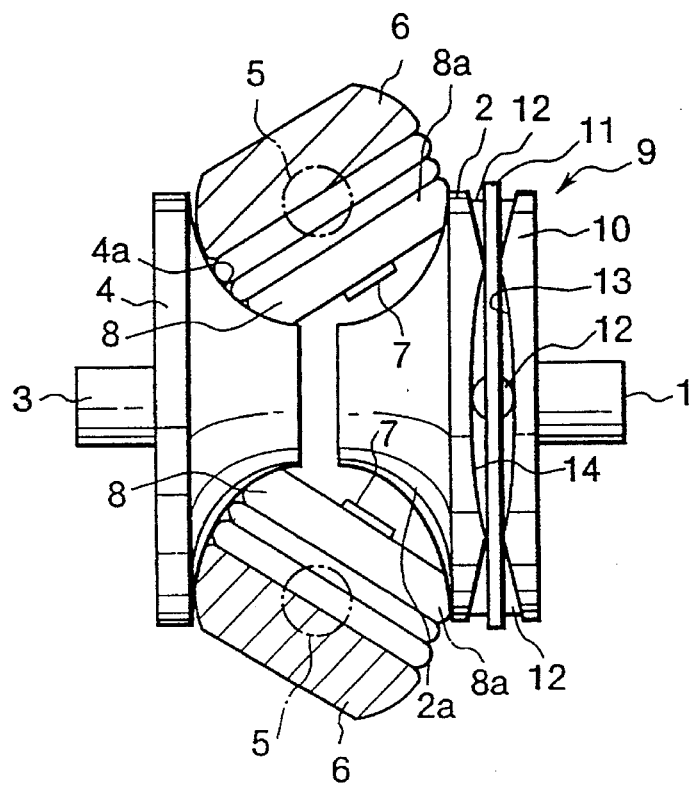
FIG. 2 is a side view which shows the fundamental structure of a conventionally known toroidal-type continuously variable transmission in a maximum state of speed acceleration.
Figure 3:
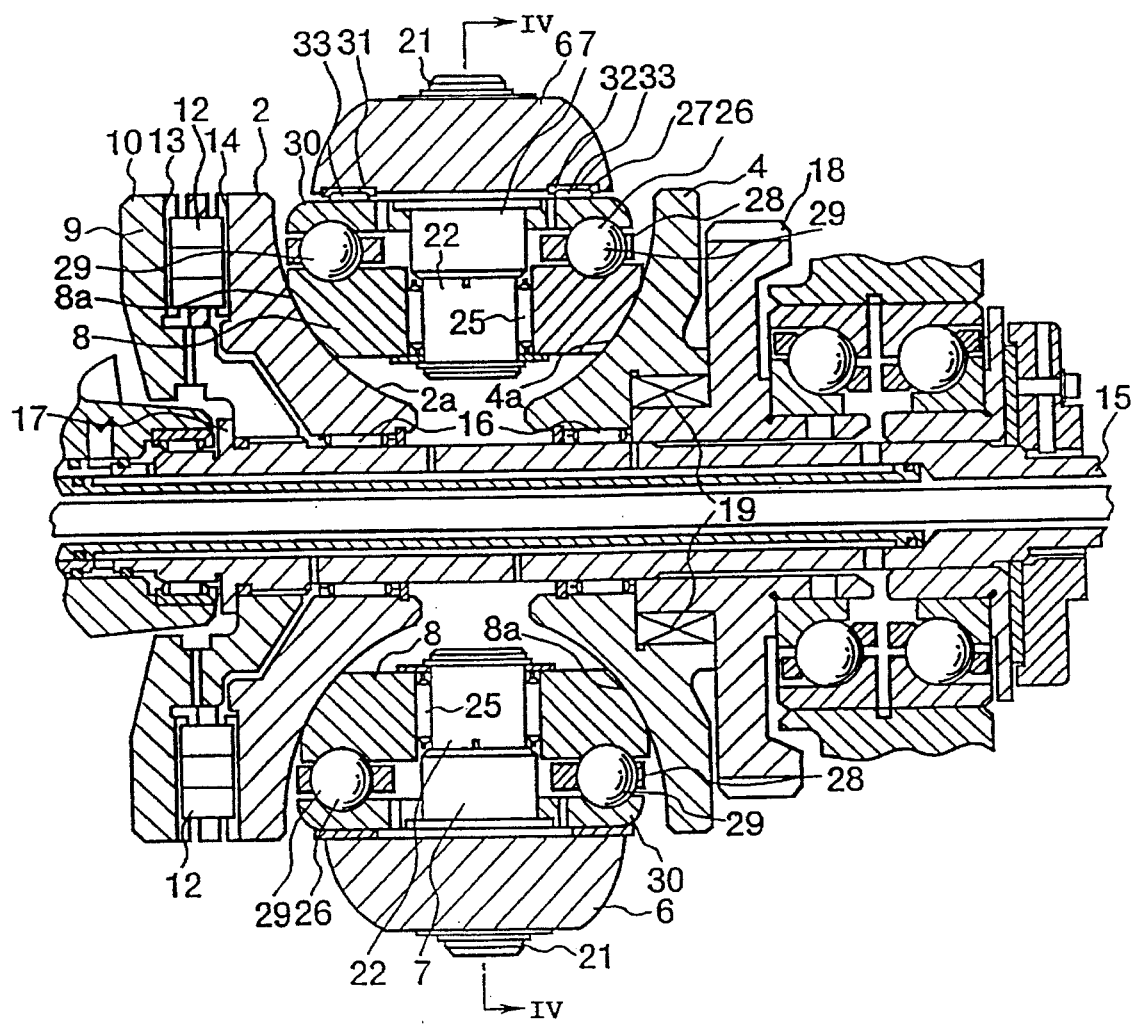
FIG. 3 is a cross-sectional view which shows one example of the specific structure according to the prior art.
Figure 4:
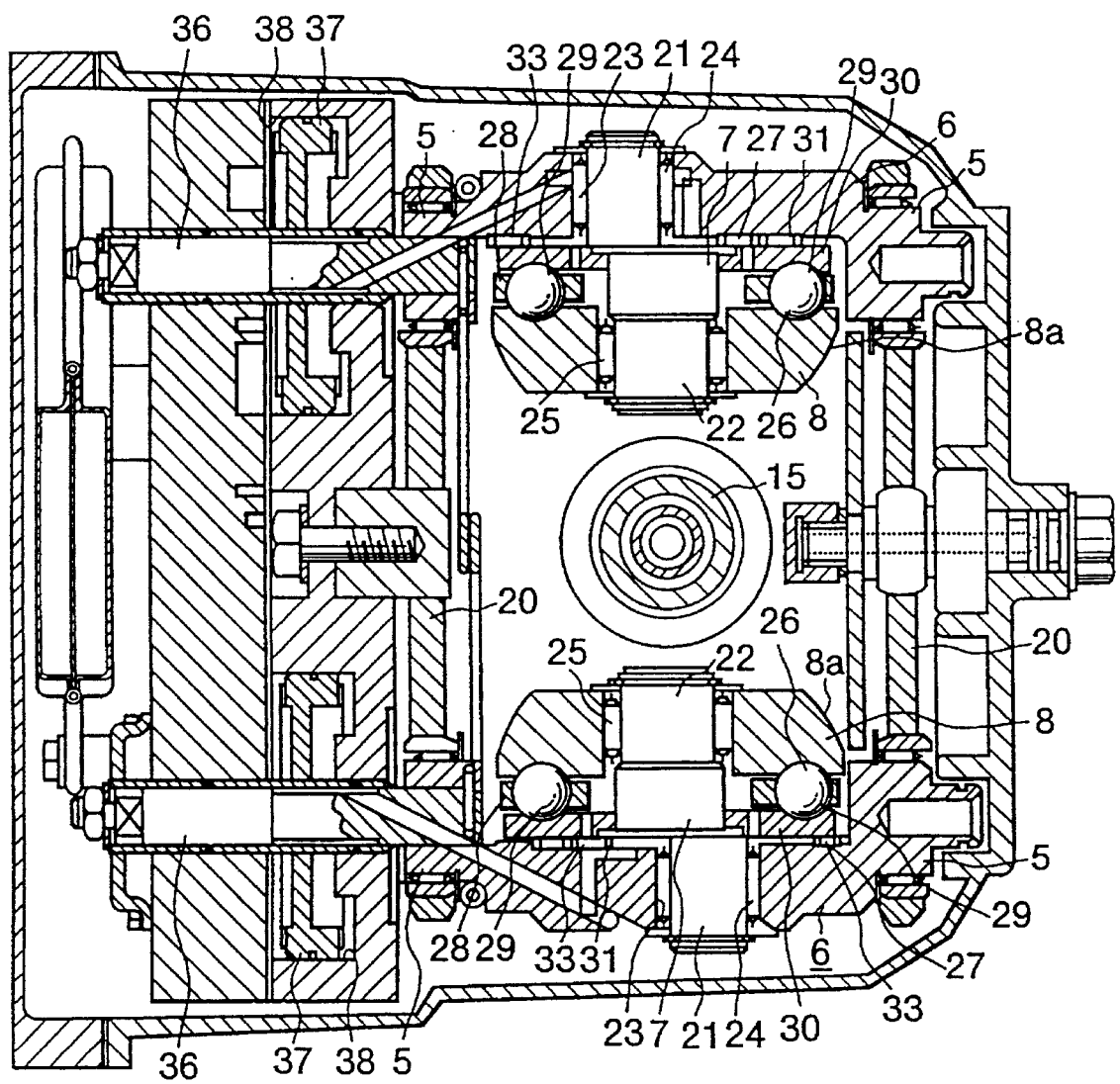
FIG. 4 is a cross-sectional view taken along line IV—IV in FIG. 3.

Hereinafter, with reference to the accompanying drawings, the detailed description will be made of a toroidal-type continuously variable transmission according to the embodiments of the present invention. In this respect, the fundamental structure of the toroidal-type continuously variable transmission of the present invention is the same as that of the conventional toroidal-type continuously variable transmission which has already been described in conjunction with FIG. 3 and FIG. 4. Therefore, the description thereof will be omitted.

Figure 5A:
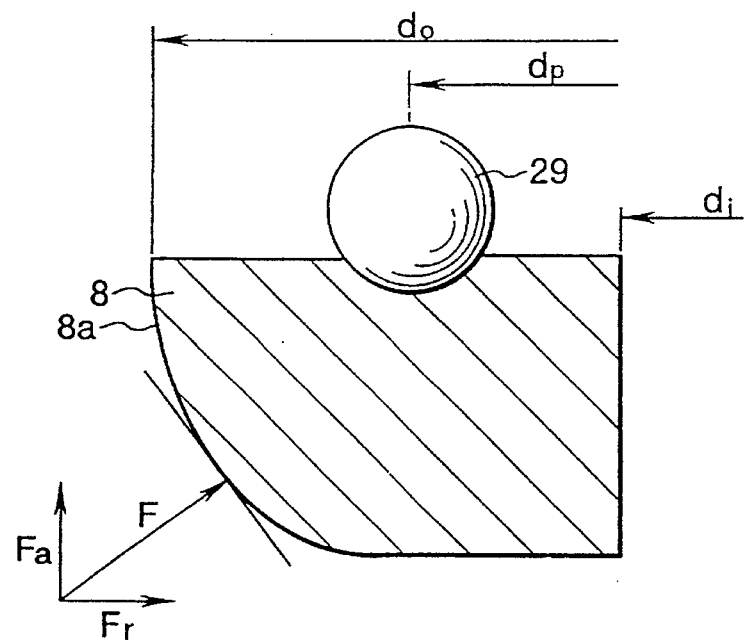
FIGS. 5A and 5B are views showing two examples of the sectional configuration of the power rollers.
Figure 5B:
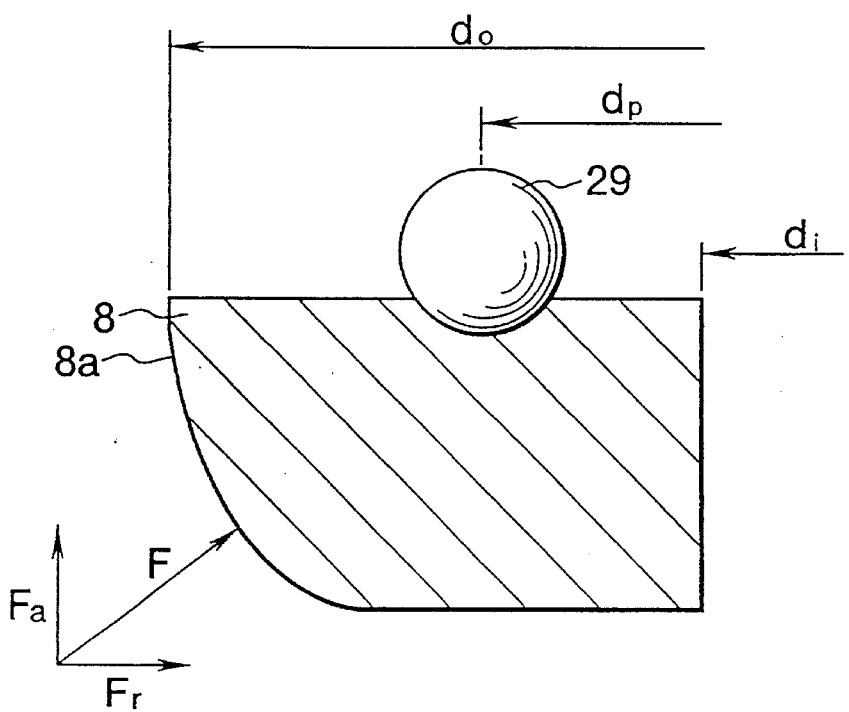
Figure 6A:
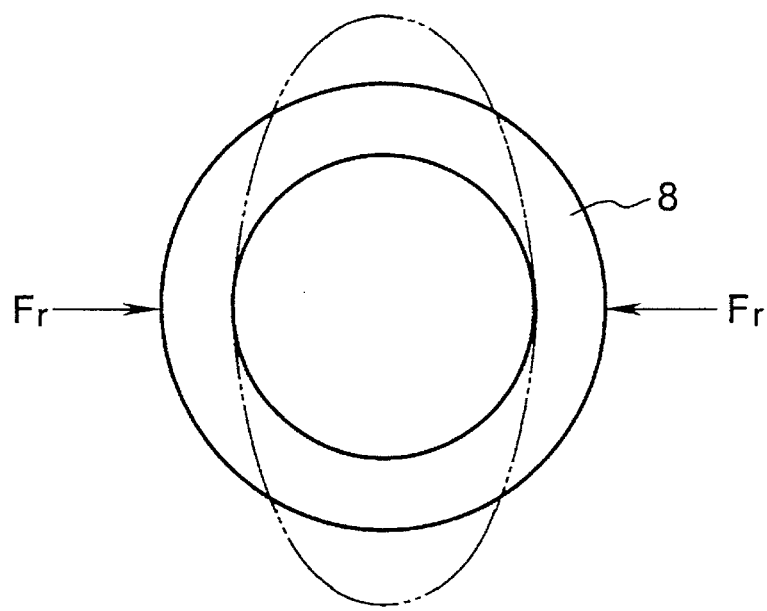
FIGS. 6A and 6B are views showing the state of the radial loads being exerted on the power rollers.
Figure 6B:
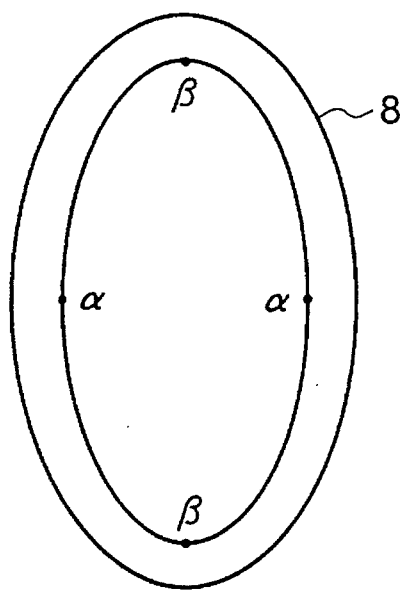
Figure 7A:
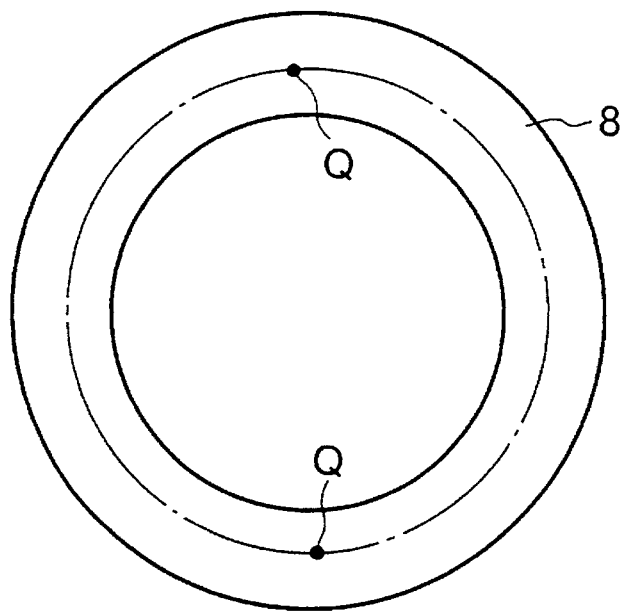
FIGS. 7A and 7B are views showing the state of the thrusting loads being exerted on the power rollers.
Figure 7B:
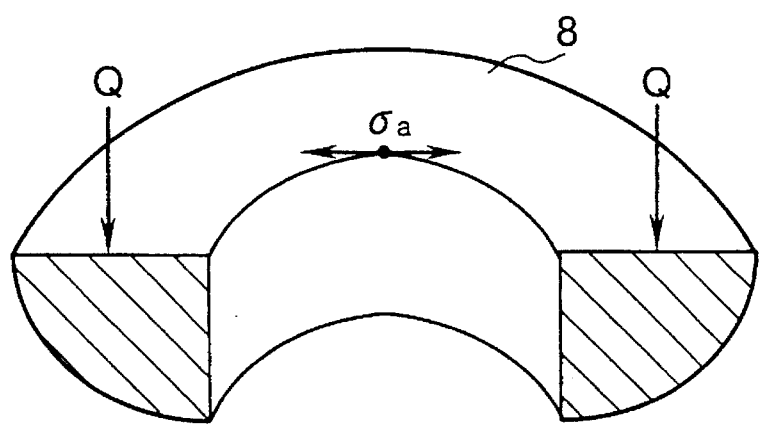

FIG. 5B shows an exemplary structure according to the present invention. Details of specific embodiments are given in Table 1, discussed later.

Figure 8:
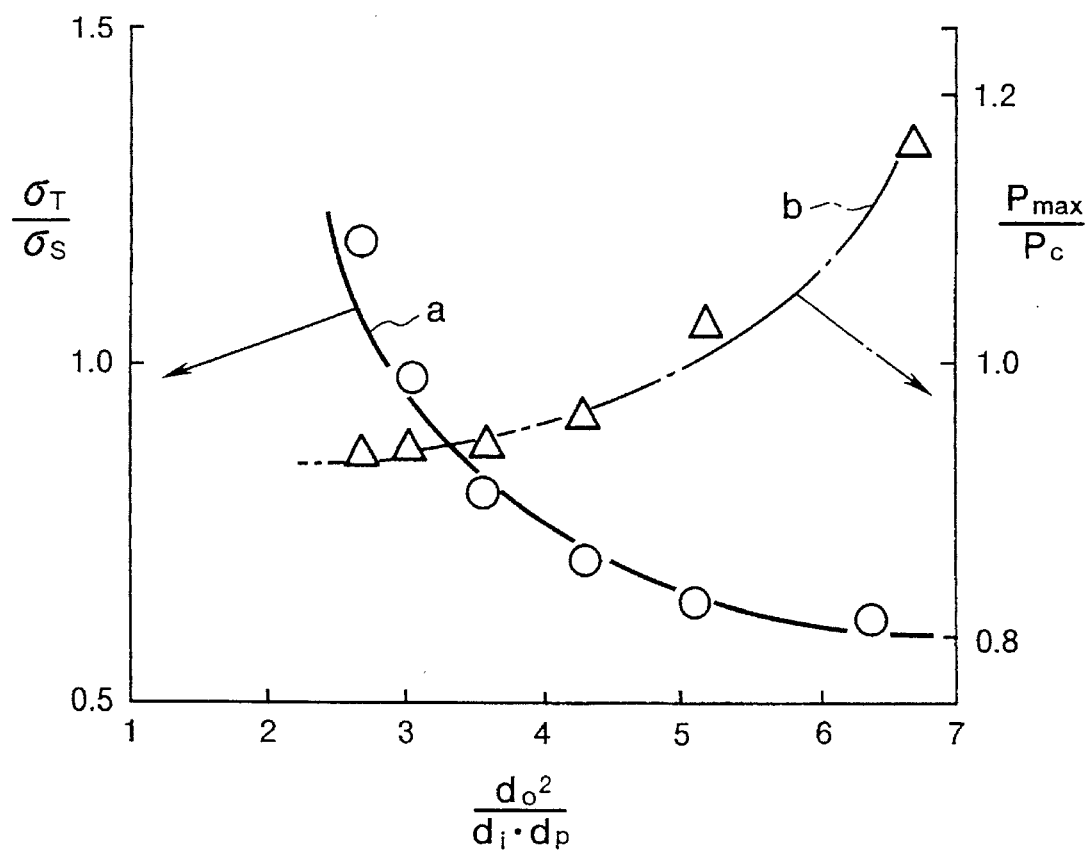
FIG. 8 is a diagram showing the influences exerted on the tensile stress and the maximum contact pressure by the dimension of each part.
Figure 5A:
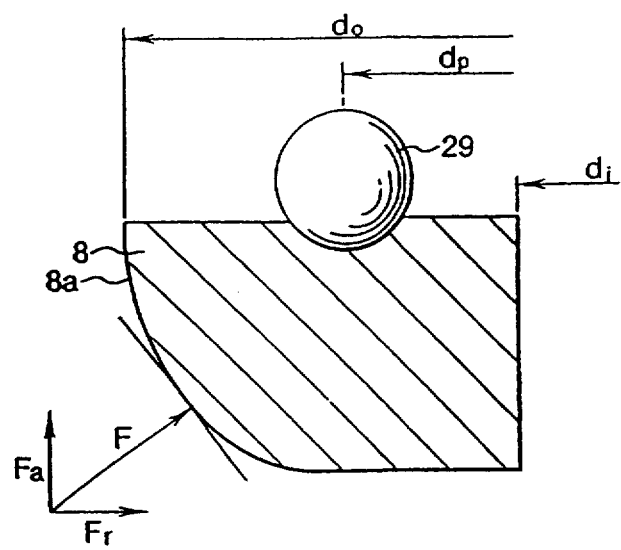
Figure 5B:
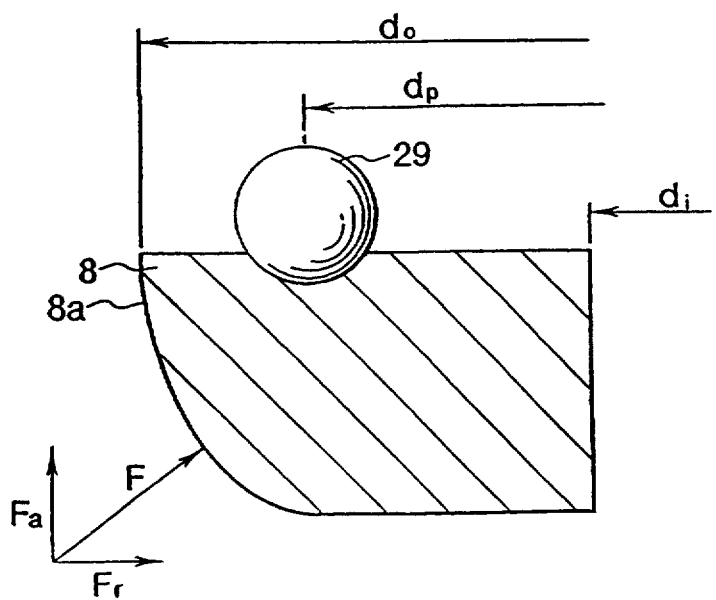

The axis of ordinate in FIG. 8 represents the ratio, $\sigma_T/\sigma_s$, between the tensile stress $\sigma_T$ and the fatigue limit $\sigma_s$, and the ratio, $P_{max}/P_c$, between the maximum contact pressure $P_{max}$ and the critical contact pressure $P_c$, and the axis of abscissa represents the ratio, $d_o^2/(d_i \cdot d_p)$, between the square $d_o^2$ of the outer diameter $d_o$, and the product $d_i \cdot d_p$ of the inner diameter $d_i$ and the diameter $d_p$ of pitch circle, respectively. Here, the critical contact pressure $P_c$ means a plane pressure beyond an applied contact pressure, at which the raceway surface formed for the power roller 8 is plastically deformed to have indentations thereon.

As clear from the description in conjunction with FIG. 8, the tensile stress $\sigma_T$ does not exceed the fatigue limit $\sigma_s$ if $3 < d_o^2/(d_i \cdot d_p)$. Also, the maximum contact pressure $P_{max}$ does not exceed the critical contact pressure $P_c$ if $d_o^2/(d_i \cdot d_p) < 5$. Hence, if only the relationship between the inner diameter $d_i$ of the power rollers 8, the outer diameter $d_o$ thereof, the diameter $d_p$ of each pitch circle of the plural balls 29 and 29 constituting the thrust ball bearing 26 and 26 is regulated to be $3 < d_o^2/(d_i \cdot d_p) < 5$, it is possible to suppress the fatigue limit $\sigma_a$ to be less than the tensile stress $\sigma_T$, and the maximum contact pressure $P_{max}$ to be less than the critical contact pressure $P_c$ at the same time.

Thus, by suppressing the tensile stress $\sigma_T$ to be less than the fatigue limit $\sigma_s$, damage such as cracks can hardly be generated on the inner diametral sections of the power rollers 8 and 8 even when the repeated tensile stress is exerted thereon. Also, by suppressing the maximum contact pressure $P_{max}$ to be less than the critical contact pressure $P_c$, it is possible to prevent the indentations from being formed on the raceway surface of the power rollers 8 and 8, hence preventing vibration from being generated.

In this respect, the relationship between $d_o^2/(d_i \cdot d_p)$ and each of the ratios $\sigma_T/\sigma_s$, and $P_{max}/P_c$ obtained by finite element method (FEM) analysis is shown in Table 1 given below. FIG. 8 is prepared on the basis of this Table 1. In obtaining the analytical results of the embodiments 1 to 3, and the comparative examples 1 to 3 shown in the Table 1, the inner diameter $d_i$ and the pitch circle diameter $d_p$ are varied while the outer diameter $d_o$ of the power rollers are kept at a constant value (80 mm). This is because the outer diameter $d_o$ cannot be made greater from the viewpoint of implementing the provision of a small and light toroidal-type continuously variable transmission with the power rollers being incorporated in it. Also, for some of the toroidal-type continuously variable transmissions having the smaller diameter $d_p$ of the pitch circle, the number Z of balls is modified in order to prevent the adjacent balls from interfering with each other. Also, among the loads F exerted on the power rollers, the component force $F_r$ in the radial direction is made 60 kN, and the component force $F_a$ in the thrust direction is made 30 kN. Further, the diameter of a ball is 16 mm. The fatigue limit is 1,000 MPa, and the critical contact pressure $P_c$ is 4,000 MPa. To obtain these values, those constituents are made of the bearing steel which is treated in a usual manner.

expression, $d_o^2/(d_i \cdot d_p)$, where the outer diameter of power roller is $d_o$, inner diameter thereof is $d_i$, and diameter of pitch circle is $d_p$, is defined within a range of 3 to 5 as in the case of the toroidal-type continuously variable transmission in accordance with the present invention.

Since the toroidal-type continuously variable transmission of the present invention is structured to function as described above, it is possible to avoid the generation of vibration, and provide a toroidal-type continuously variable transmission having excellent durability.

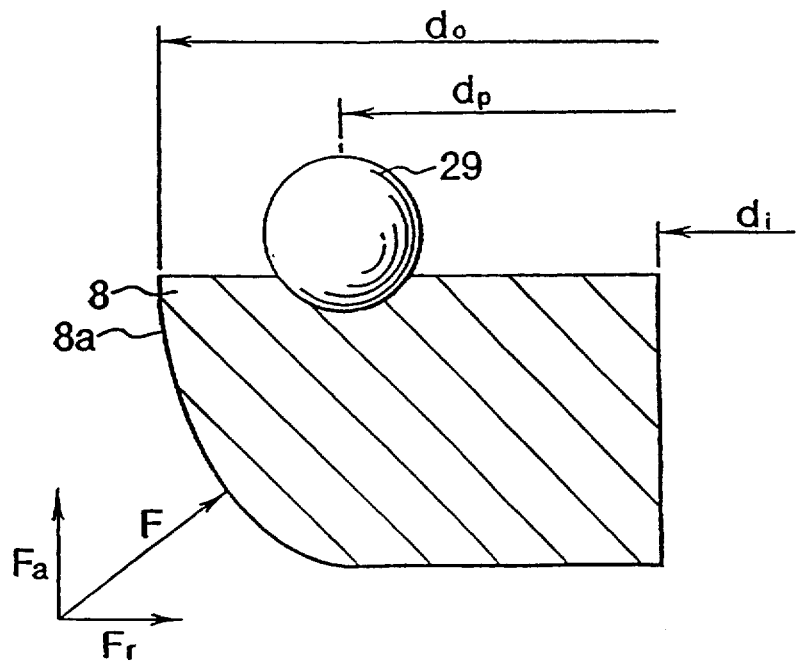

What is claimed is:

1. A toroidal-type continuously variable transmission, comprising:

first and second discs rotatably supported coaxially with each other and having respective inner faces arranged to face each other;

a trunnion swingable around an axis transverse to respective central axes of said first and second discs;

a displacement shaft extending from an inner face of said trunnion;

a power roller disposed between said first and second discs and rotatably supported around said displacement shaft; and a thrust ball bearing arranged between an outer face of said power roller and said inner face of said trunnion to allow said power roller to rotate while receiving and supporting a load exerted on said power roller in a thrusting direction, wherein, when an inner diameter of said power roller is $d_i$, an outer diameter of said power roller is $d_o$, and a diameter of a pitch circle of balls constituting said thrust ball bearing is $d_p$, the following condition is satisfied:

TABLE 1

|  | $d_o$ (mm) | $d_i$ (mm) | $d_p$ (mm) | Z (pieces) | $\dfrac{d_o^2}{d_i \cdot d_p}$ | $\dfrac{\sigma_T}{\sigma_s}$ | $\dfrac{P_{max}}{P_c}$ |
|---|---|---|---|---|---|---|---|
| Comparative Examples |  |  |  |  |  |  |  |
| 1 | 80 | 25 | 40 | 5 | 6.4 | 0.62 | 1.17 |
| 2 | 80 | 25 | 50 | 7 | 5.12 | 0.65 | 1.03 |
| 3 | 80 | 40 | 60 | 9 | 2.67 | 1.18 | 0.93 |
| Embodiments |  |  |  |  |  |  |  |
| 1 | 80 | 25 | 60 | 9 | 4.27 | 0.71 | 0.96 |
| 2 | 80 | 30 | 60 | 9 | 3.56 | 0.81 | 0.94 |
| 3 | 80 | 35 | 60 | 9 | 3.05 | 0.98 | 0.94 |

As is clear from the particulars shown in the Table 1 for the embodiments 1 to 3, it is possible to suppress any one of $\sigma_T/\sigma_s$, $P_{max}/P_c$ to less than 1 if each value of the relational $$3 < d_o^2/(d_i \cdot d_p) < 5.$$

* * * * *

UNITED STATES PATENT AND TRADEMARK OFFICE
CERTIFICATE OF CORRECTION

PATENT NO. : 5,575,736
DATED : November 19, 1996
INVENTOR(S) : Hiromichi Takemura It is certified that error appears in the above-identified patent and that said Letters Patent is hereby corrected as shown below:

The title page should be deleted to appear as per attached.

In the drawings:
    Delete drawing sheet 4, and substitute therefor the drawing sheet, consisting of Figs. 5A - 5B, as shown on the attached page Signed and Sealed this Eighth Day of September, 1998

Attest:

BRUCE LEHMAN

*Attesting Officer*      *Commissioner of Patents and Trademarks*

United States Patent

Takemura

Patent Number: 5,575,736
Date of Patent: Nov. 19, 1996

[54] TOROIDAL-TYPE CONTINUOUSLY VARIABLE TRANSMISSION

[75] Inventor: Hiromichi Takemura, Fujisawa, Japan

[73] Assignee: NSK, Ltd., Tokyo, Japan

[21] Appl. No.: 389,051

[22] Filed: Feb. 15, 1995

[30] Foreign Application Priority Data

Mar. 8, 1994 [JP] Japan ................ 6-037014

[51] Int. Cl.$^6$ ............................................. F16H 15/38
[52] U.S. Cl. ......................................... 476/46; 476/40
[58] Field of Search ................................. 476/39, 40, 46

[56] References Cited

U.S. PATENT DOCUMENTS

| | | | |
|---|---|---|---|
| 4,909,092 | 3/1990 | Machida et al. | 74/200 |
| 5,007,298 | 4/1991 | Machida | 476/46 |

FOREIGN PATENT DOCUMENTS

| | | |
|---|---|---|
| 2521673 | 8/1983 | France . |
| 1203078 | 10/1965 | Germany . |
| 62-71465 | 5/1987 | Japan . |
| 62-158250 | 10/1987 | Japan . |
| 1-173552 | 12/1989 | Japan . |
| 5-71515 | 9/1993 | Japan . |

*Primary Examiner*—Charles A. Marmor
*Assistant Examiner*—David Fenstermacher
*Attorney, Agent, or Firm*—Shapiro and Shapiro

[57] ABSTRACT

A toroidal-type continuously variable transmission is obtainable having excellent durability without generating vibration. Given each inner diameter of the power rollers as $d_i$, the outer diameter thereof as $d_o$, and the diameter of each pitch circle of the plural balls which constitutes the thrust ball bearings as $d_p$, an expression of $3<d_o^2/(d_i \cdot d_p)<5$ is satisfied. As a result, the tensile stress can be suppressed to less than its fatigue limit. Thus any damage, such as cracks, due to repeated tensile stresses in the inner diametral portion of the power rollers are reduced. Also, the maximum contact pressure is suppressed to less than its critical contact pressure in order to prevent any indentations from being formed on the surface of the raceways arranged for the power rollers.

1 Claim, 7 Drawing Sheets